UNITED STATES PATENT OFFICE.

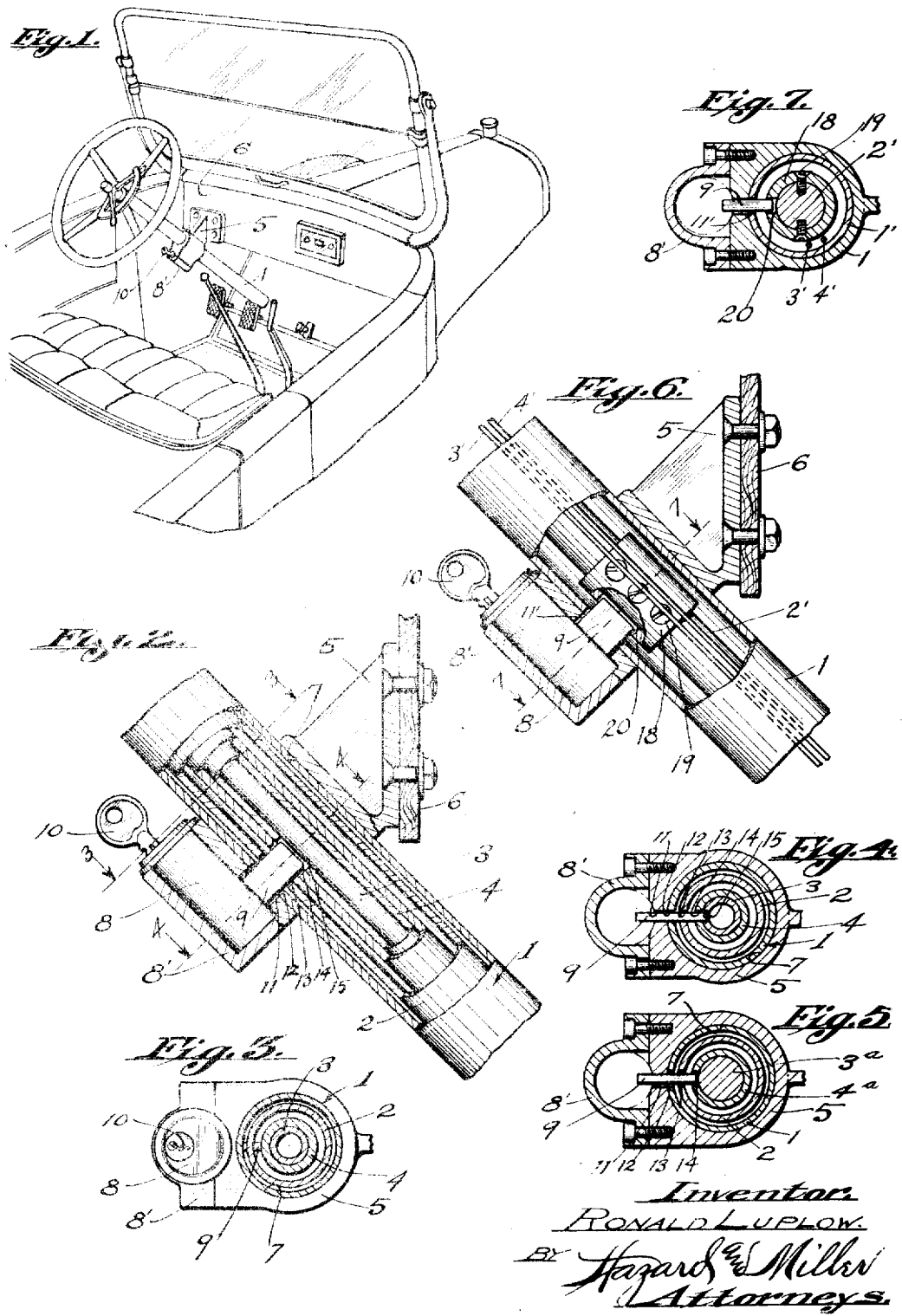

RONALD LUPLOW, OF PHOENIX, ARIZONA.

AUTOMOBILE-LOCK.

1,398,905.  Specification of Letters Patent.  Patented Nov. 29, 1921.

Application filed May 20, 1920. Serial No. 382,791.

*To all whom it may concern:*

Be it known that I, RONALD LUPLOW, a citizen of the United States, residing at Phoenix, in the county of Maricopa and State of Arizona, have invented new and useful Improvements in Automobile-Locks, of which the following is a specification.

This invention is an automobile lock and has for its object the provision of an efficient but simple means for readily locking the steering post of an automobile and at the same time locking the usual spark and throttle controlling means carried by the steering post column.

The invention will be readily understood from the following description of the accompanying drawings, in which—

Figure 1 is a perspective view of a portion of an automobile showing the steering post column with the improved lock applied thereto.

Fig. 2 is a fragmentary longitudinal section through the steering post column and the improved lock.

Fig. 3 is a transverse section on the line 3—3 of Fig. 2.

Fig. 4 is a transverse section on the line 4—4 of Fig. 2, the lock mechanism being omitted.

Fig. 5 is a view similar to Fig. 4 of a modified form of the invention.

Fig. 6 is a view similar to Fig. 2 of a modified form of the invention.

Fig. 7 is a transverse section on the line 7—7 of Fig. 6.

In the embodiment of the invention illustrated in Figs. 2, 3 and 4 I have shown an automobile steering post comprising column 1 having the rotatable hollow steering post 2 extending therethrough. Hollow sleeves 3 and 4 rotatable one within the other are received in the hollow steering post 2 in usual manner, these sleeves being connected in any desired manner to the throttle or spark control levers upon the steering post column.

The improved lock is arranged to lock both the control sleeves 3 and 4 and the steering post 2. As an instance of this arrangement the lock may comprise a bracket 5; preferably, mounted upon the instrument board 6 of the automobile. The bracket is provided with an opening 7 extending therethrough, and the steering post column is arranged to be received through this opening. At the side of the steering post column convenient to the driver of the machine a lock 8 which may be of usual barrel construction or any preferred construction is secured to the bracket 5 as by a clip 8' suitably bolted to the bracket. This lock is provided with a bolt 9 projecting laterally therefrom, which bolt is adapted to be projected beyond and withdrawn into the barrel of the lock by a usual key 10, and by any suitable lock mechanism (not shown).

The bolt of the lock in its locking position is arranged to project through suitable slots 11, 12, 13, 14 and 15 arranged in the wall of bracket 5, in the column of the steering post, in the steering post, and in the control sleeves 3 and 4 respectively. By this arrangement the various rotatable parts having been turned to bring the slots into alinement the bolt of the lock may be projected through said slots by turning key 10 and the rotatable steering post and control sleeves are thus locked against relative rotation. The possibility of an unauthorized person driving the automobile is thus prevented.

In the modification of the invention illustrated in Fig. 5 the controlling members are shown as a hollow sleeve 4ª in which is received a rod 3ª. In employing the improved lock in connection with a steering post having this type of controlling members the slots arranged to receive the bolt of the lock are, preferably, only provided in the bracket of the lock, the steering post column, the hollow steering post and the outer hollow controlling member 4ª.

In the modification of the invention illustrated in Figs. 6 and 7 I have shown the improved lock applied to the type of steering post in which throttle and spark control rods 3' and 4' are arranged outside of the steering post 2' between the latter and the column 1' of the steering post. In this form of the invention a slot 1¹' is provided in the column of the steering post through which the bolt of the lock is arranged to extend, and a sleeve 18 is, preferably, secured upon the steering post 2' as by screws 19, this sleeve being provided with a slot 20 arranged to receive the end of the bolt of the lock when the latter is projected into locking position for locking the steering shaft against rotation.

Various changes may be made without departing from the spirit of the invention as claimed.

What is claimed is:

A steering post lock comprising a bracket having a back adapted to be fastened to a dash board or the like, a web extending angularly downward from said back and terminating in and formed integral with a steering post column support having an opening to receive the column; the rearwardly extending end of said support having two flat surfaces and a central concave curved surface intermediate the flat surfaces; a cylindrical lock casing received in said concave portion the concave portion having at its lower end a hole extending inwardly to said opening to receive the bolt of said lock which is adapted to engage a member in said column to be locked against movement; a clip member having flanges extending outwardly from a central concave curved portion, and means for fastening said clip to the support, said concave surfaces matching to form a cylindrical hole into which fits said lock casing, and a base in the lower portion of said hole against which abuts the end of said cylindrical lock casing.

In testimony whereof I have signed my name to this specification.

RONALD LUPLOW.